(12) United States Patent
Vollenberg et al.

(10) Patent No.: US 6,949,599 B2
(45) Date of Patent: Sep. 27, 2005

(54) POLYCARBONATE POLYESTER MOLDING COMPOSITION

(75) Inventors: Peter H. Th. Vollenberg, Evansville, IN (US); Gerrit de Wit, Ossendrecht (NL)

(73) Assignee: General Electric Company, Schenectady, NY (US)

(*) Notice: Subject to any disclaimer, the term of this patent is extended or adjusted under 35 U.S.C. 154(b) by 95 days.

(21) Appl. No.: 10/650,391

(22) Filed: Aug. 28, 2003

(65) Prior Publication Data

US 2005/0065293 A1 Mar. 24, 2005

(51) Int. Cl.⁷ ............................................. C08L 69/00
(52) U.S. Cl. ........................ 524/417; 524/414; 525/439
(58) Field of Search ..................... 525/439; 524/147, 524/414, 417

(56) References Cited

U.S. PATENT DOCUMENTS

| | | | |
|---|---|---|---|
| 4,188,314 A | 2/1980 | Fox et al. | |
| 4,786,692 A | 11/1988 | Allen et al. | |
| 4,879,355 A | * 11/1989 | Light et al. ................. | 525/439 |
| 5,017,659 A | 5/1991 | van der Groep | |
| 5,194,523 A | 3/1993 | Small | |
| 5,207,967 A | * 5/1993 | Small et al. ........... | 264/328.16 |
| 5,399,661 A | 3/1995 | Borman | |
| 5,486,562 A | 1/1996 | Borman | |
| 5,942,585 A | 8/1999 | Scott | |
| 6,005,059 A | 12/1999 | Scott | |
| 6,011,124 A | 1/2000 | Scott | |
| 6,037,424 A | 3/2000 | Scott | |
| 6,043,322 A | 3/2000 | Scott | |
| 2002/0128357 A1 | 9/2002 | Hoogland | |

FOREIGN PATENT DOCUMENTS

| | | |
|---|---|---|
| GB | 1559230 A | 1/1980 |
| WO | WO 99/63002 | * 12/1999 |

* cited by examiner

Primary Examiner—David J. Buttner
(74) Attorney, Agent, or Firm—Oppedahl & Larson LLP

(57) ABSTRACT

A clear blend of three resin components includes a first polycarbonate resin component; a second resin component of a first polyester copolymer resin derived from a cycloaliphatic diol and a cycloaliphatic dicarboxylic acid, and a third resin component of a second polyester polymer resin derived from the condensation of a cyclohexane diol with a terephthalic acid and an additional condensation reaction component selected from aliphatic or aromatic diacids or diols suitable for enhancing the clarity of said blend wherein the three component blend has a light transmission of seventy percent or greater and an elongation at break after exposure to Fuel C of forty percent or greater.

13 Claims, 1 Drawing Sheet

DESIGN-EXPERT Plot
Overlay Plot
• Design Points
X1 = PC
X2 = PCCD
X3 = PCT
Actual Factor
D = PCT

DESIGN-EXPERT Plot
Overlay Plot
• Design Points
X1 = PC
X2 = PCCD
X3 = PCT
Actual Factor
D = PCTG

DESIGN-EXPERT Plot
Overlay Plot
• Design Points
X1 = PC
X2 = PCCD
X3 = PCT
Actual Factor
D = PCTA

US 6,949,599 B2

POLYCARBONATE POLYESTER MOLDING COMPOSITION

FIELD OF THE INVENTION

This invention relates to clear blends of polycarbonate and polyester resins.

BACKGROUND OF THE INVENTION

U.S. Pat. No. 5,942,585 to Scott et al relates to clear blends of polycarbonates and polyesters where the polyester comprises a dicarboxylic acid component based on 1,4-cyclohexanedicarboxylic acid units and a glycol component comprising 2,2,4,4-tetramethyl-1,3-cyclobutanediol units. Miscible polycarbonate polyester blends are described in a Free Volume approach to the Mechanical Behaviour of Miscible Polycarbonate Blends, by A. J. Hill et al, J. PHYS.: Condens Matter, 8, 3811–3827 (1996) and in Dynamic Mechanical and Dielectric Relaxation Study of Aliphatic Polyester Based Blends by Stack et al., J. M. Polym. Mater. Sci. Eng. (1993), 69, 4–5, Eastman Chemical Company, Kingsport, Tenn. 37662. U.S. Pat. No. 4,879,355 to Light et al relates to a clear polymer blend comprising a glycol copolyester having repeat units from 1,4-cyclohexanedimethanol, terephthalic acid and an alkylene glycol; a polycarbonate resin; and an aromatic polyester having repeat units from terephthalic acid, isophthalic acid and Bisphenol A. U.S. Pat. No. 4,786,692 to Allen et al. relates to a blend of an aromatic polycarbonate and a copolymer derived from a glycol portion comprising 1,4-cyclohexanedimethanol and ethylene glycol. Some of these references describe clear properties of the thermoplastic blends.

U.S. Pat. No. 5,399,661 to Borman et al relates to copolyester compositions which comprise the reaction product of at least one straight chain, branched, or cycloaliphatic C2–C10 alkane diol or a chemical equivalent and a mixture of at least two cycloaliphatic diacids. The diacid mixture comprises predominantly a trans isomer and at least one aromatic diacid. As set forth in column 5, lines 41 to 45, "The reaction is generally run with an excess of the diol component and in the presence of a suitable catalyst ***". U.S. Pat. No. 5,486,562 to Borman et al additionally describes an impact strength modifier for compositions of the type set forth in the '661 patent.

U.S. Pat. No. 4,879,355 to Light et al. describes a clear polymer blend comprising (1) 50–90 wt. % of a glycol copolyester having repeat units from 1,4-cyclohexanedimethanol, terephthalic acid and an alkylen glycol; (2) 45–5 wt. % of a polycarbonate resin; and (3) 5–45 wt. % of an aromatic polyester having repeat units from terephthalic acid, isophthalic acid and Bisphenol A.

U.S. Pat. No. 4,188,314 to Fox describes the addition of a polyester polymer derived from a cyclohexanedimethanol and a mixture of iso- and terephthalic acid to an aromatic carbonate polymer to enhance the solvent resistance as compared to a polycarbonate article.

Other references include U.S. Pat. Nos. 4,879,355; 6,043, 322; 6,037,424; 6,011,124; 6,005,059; 5,942,585; 5,194, 523; and 5,017,659 and GB 1,559,230A.

Transparent blends of polycarbonate and polyesters may have attractive properties like toughness and chemical resistance. Also, UV resistance may be improved over that of polycarbonate by itself. Certain compositional blends of these resins may have high optical transparency and good chemical resistance. It is desired to enlarge the compositional design space in which the combination of these properties may be met.

SUMMARY OF THE INVENTION

According to an embodiment, a clear thermoplastic blend includes three resin components. A first resin component is a polycarbonate resin. A second resin blend component is a first polyester copolymer resin derived from a cycloaliphatic diol or equivalent thereof and a cycloaliphatic dicarboxylic acid or equivalent thereof. A third resin component is a second polyester polymer resin derived from the condensation of a cyclohexane diol or equivalents thereof with a terephthalic acid or equivalents thereof and an additional condensation reaction component selected from aliphatic or aromatic diacids or diols suitable for enhancing the clarity of said blend. The three components are present in proportions for to form a clear blend having a transmission of seventy percent or greater and an elongation at break after exposure to Fuel C of forty percent or greater. Desirable enhanced chemical resistance is provided to the polycarbonate/ polyester blend by the addition of the third component, which is the second polyester, as compared to a two component blend absent said second polyester component.

According to an embodiment, the blend consists essentially of the three resin components wherein the first resin component is present in an amount about 35 to about 65 weight percent of the blend based on the total weight of the three blend components. The second resin blend component, i.e. first polyester component, is present in an amount of about 33 to about 65 weight percent based on the total weight. The third resin blend component, i.e. second polyester component, is present in an amount from about 2 to about 35 weight percent based on the total weight of the blend.

According to an embodiment, the clear three component blend consist essentially of a polycarbonate resin, a second component of a first polyester derived from cyclohexanedimethanol or equivalents and a dimethyl cyclohexanedicarboxylic acid or equivalents, and a third component of a second polyester which is derived from the reaction of 1,4-cylohexanedimethanol or equivalents, with a mixture of terephthalic acid or equivalents and isophthalic acid or equivalents wherein the isophthalic acid is present in said mixture in an amount for enhancing the clarity of the three component blend.

According to an embodiment, desirable enhanced chemical resistance is provided with the addition of the second polyester as compared to a two component blend absent said second polyester component.

According to an embodiment, a clear three component blend comprises a first component polycarbonate resin, a second component of a first polyester derived from cyclohexanedimethanol or equivalents and a dimethyl cyclohexanedicarboxylic acid or equivalents, and a third component of a second polyester derived from the condensation reaction of a mixture of 1,4-cylohexanedimethanol or equivalents and ethylene glycol or equivalents with terephthalic acid or equivalents wherein the ethylene glycol is present in said mixture in an amount for enhancing the clarity of the three component blend.

The polyester resins are typically obtained through the condensation or ester interchange polymerization of the diol or diol equivalent component with the diacid or diacid chemical equivalent component according to methods known in the prior art. The polycarbonate resin components are prepared according to prior art techniques as referred to herein.

DESCRIPTION OF THE DRAWINGS

The FIGS. 1A, 1B and 1C, respectively, show ternary type diagrams for the resin blends set forth.

DETAILED DESCRIPTION OF THE INVENTION

Figure 1A:
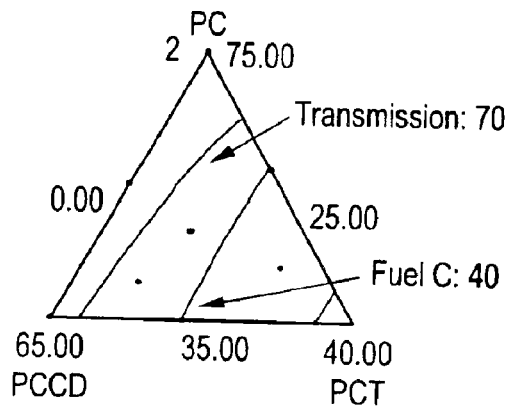

For sake of clarity, the following Table 1 sets forth the meaning of the abbreviations used throughout the specification.

TABLE 1

Abbreviations

| Abbreviation | Name |
|---|---|
| PC | polycarbonate |
| PCCD | 1,4-cyclohexanedicarboxylic acid, polymer with 1,4-cyclohexanedimethanol (9Cl Chemical Abstracts Index name); also poly(1,4-cyclohexylenedimethylene 1,4-cyclohexanedicarboxylate) |
| CHDM | 1,4-cyclohexanedimethanol (trans/cis mixture) |
| t-DMCD | dimethyl trans-1,4-cyclohexanedicarboxylate |
| TPA | Terephthalic acid |
| IPA | Isophthalic acid |
| EG | Ethylene glycol |
| PCT | polycyclohexane dimethanol terephthalate (TPA + CHDM) |
| PCTA | TPA + IPA + CHDM |
| PCTG | TPA + CHDM + EG |
| MV | Melt Viscosity |
| $T_m$ | Melting Point |

PCCD and PC are miscible and mixing results in transparent translucent blends, having a single $T_g$ and excellent impact performance.

Surprisingly it was found that by using PCTA or PCTG as an additional polyester polymer component to PCCD in the blend, the compositional design space can be increased. PCTA is preferred for obtaining a large compositional design space in which the favorable combination of high optical transparency and good chemical resistance can be met. This is graphically shown in FIG. 1, where the light colored areas in the compositional areas indicate formulations that meet an optical transparency of over 70% with a tensile elongation at break after exposure to Fuel C of over 40%. The benefit of adding PCTA type polymers to PC/PCCD blends is that the heat and chemical resistance are improved and the total raw material cost of the formulation can be reduced.

In an embodiment, the transparent ternary blend includes PC, PCCD, and a 1) cycloaliphatic polyester containing the condensation product of 1,4-cyclohexanedimentanol and a mixture of terephthalic acid, divalent residues or derivatives thereof and isophthalic acid, divalent residues, or derivatives or 2) cycloaliphatic polyester containing the condensation product of 1,4-cyclohexanedimentanol, ethylene glycol, and a terephthalic acid, divalent residues or derivatives thereof. Preferably the third component of the above ternary blend is PCTA which comprises the reaction product of CHDM, TPA and IPA. The third component may be PCTG type as set forth in 2). In this case CHDM and DMCD condensation reactants and equivalents thereof may include polyol components such as divalent aliphatic, alicyclic or aromatic radical diols, or diol derivatives, or mixtures of such diols and derivatives that do not adversely affect the favorable desired properties. One such example is the addition ethylene glycol to the condensation reaction of CHDM and TPA.

A process for the preparation of transparent/translucent molding composition comprises selecting a blend of PCCD, PC and PCTA or PCTG within the compositional range of ingredients for imparting clear or transparent properties to the resulting blend and wherein said proportions of ingredients are selected so as to impart high heat and chemical resistant properties.

The cycloaliphatic polyester resin has repeating units of the formula IA:

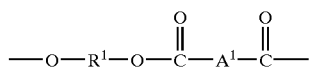

With reference to the previously set forth general formula, for $R^1$ is derived from 1,4 cyclohexane dimethanol or chemical equivalent; and $A^1$ is a cyclohexane ring derived from cyclohexanedicarboxylate or a chemical equivalent thereof. The favored PCCD has a cis/trans formula.

A preferred cycloaliphatic polyester is poly(cyclohexane-1,4-dimethylene cyclohexane-1,4-dicarboxylate) also referred to as poly(1,4-cyclohexane-dimethanol-1,4-dicarboxylate) (PCCD) which has recurring units of formula IB:

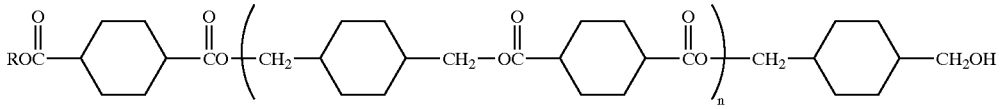

In formula IA, R is H or a lower alkyl.

The polyester polymerization reaction is generally run in the melt in the presence of a suitable catalyst such as a tetrakis (2-ethyl hexyl) titanate, in a suitable amount, typically about 50 to 200 ppm of titanium based upon the final product.

Preferred cycloaliphatic polyesters will have weight average molecular weights (determined by gel permeation chromatography using polystyrene standards) of about 30,000 to about 150,000 atomic mass units (amu), with about 60,000 to about 100,000 amu being preferred, and about 65,000 to about 95,000 amu being more preferred. Preferred cycloaliphatic polyesters will also have viscosities of about 500 to about 25,000 poise, with about 1,000 to about 20,000 poise being preferred, and about 2,000 to about 6,000 poise being more preferred.

Also contemplated herein are the above polyesters with from about 1 to about 50 percent by weight, of units derived from polymeric aliphatic acids and/or polymeric aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

In the preferred formula IB:

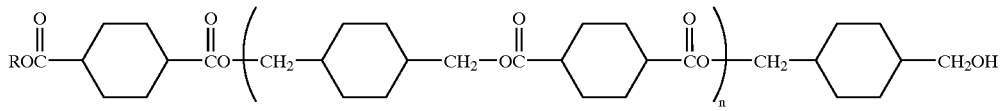

R is an alkyl from 1 to 6 carbon atoms or residual endgroups derived from either monomer, and n is greater than about 70. The polyester is derived from the transesterification reaction of a starting DMCD and a starting CHDM. The trans-cis ratio of repeating units derived from DMCD is preferably greater than about 8 to 1, and the trans-cis ratio of repeating units derived from CHDM is preferable greater than about 1 to 1. The polyester resin typically a viscosity greater than 3500 poise and a melting temperature greater than 216 C. degrees Centigrade, and an acid number less than about 10, preferably less than about 6 meq/kg.

The linear PCCD polyester is prepared by the condensation reaction of CHDM and DMCD in the presence of a catalyst wherein the starting DMCD has a trans-cis ratio greater than the equilibrium trans-cis ratio. The resulting prepared PCCD polyester has a trans-cis ratio of repeating polymer units derived from the respective starting DMCD which has a trans-cis ratio substantially equal to the respective starting trans-cis ratio for enhancing the crystallinity of the resulting PCCD.

The starting DMCD typically has a trans-cis ratio greater than about 6 to 1, preferably greater than 9 to 1, and even more preferably greater than 19 to 1. In the resulting PCCD, it is preferable that less than about 10 percent the starting trans DMCD, and more preferable that less than about 5 percent of the starting trans DMCD be converted to the cis isomer during the reaction of CHDM and DMCD to produce PCCD. The trans:cis ratio of the CHDM is preferable greater than 1 to 1, and more preferably greater than about 2 to 1.

The resulting linear PCCD polymer is characterized by the absence of branching. During the reaction process, branching may be induced by the addition of polyglycol and such branching agents as trimellitic acid or anhydride, trimesic acid, trimethyiolethane, trimethylolpropane, or a trimer acid. The use of such branching agents is not desirable according to the present invention.

The preferred enhanced melt viscosity of the final prepared PCCD is greater than 3500 poise with temperatures of melting, $T_m$, being greater than about 220 degrees Centigrade. The acid number which is determined by the number of acid end groups on the polymer chain is preferably less than about 6 meq/kg as determined from the titration method. Preferred melting temperature is preferably greater than about 216 degrees Centigrade and more preferably from about 216 to about 230 degrees Centigrade. Preferably the amount of catalyst present is less than about 200 ppm. Typically, catalyst may be present in a range from about 20 to about 300 ppm. The most preferred materials are blends where the polyester has both cycloaliphatic diacid and cycloaliphatic diol components specifically polycyclohexane dimethanol cyclohexyl dicarboxylate (PCCD). The preferred polycarbonate comprises units of BPA, SBI bis phenol, aryl substituted bisphenols, cycloaliphatic bisphenols and mixtures thereof.

The PCTA cycloaliphatic polyester resin comprises a polyester having repeating units of the formula IIA, —O—$R^2$—O—(CO)—$A^2$—(CO)— and IIB, —O—$R^2$—O—(CO)—$A^3$—(CO)—. The polyester is a condensation product having units of formula IIA and IIB where $R^2$ in both formulae are a cyclohexyl group which is the residue from a cyclohexyl diol or chemical equivalent thereof. Formula IIA has phenyl units $A^2$ derived from the dicarboxylic acid isophthalic acid or derivatives thereof and formula IIB has phenyl $A^3$ units derived from the dicarboxylic acid terephthalic acid or derivatives thereof.

According to an embodiment, the PCTA type cycloaliphatic polyesters are condensation products of aliphatic diacids, or chemical equivalents and aliphatic diols, or chemical equivalents. The present PCTA cycloaliphatic polyesters are formed from a mixture of isophthalic acid or derivatives thereof and terephthalic acid or derivatives thereof. The hexacarbocyclic dicarboxylic acids which are condensed with the cyclohexanedimethanol are mixtures of terephthalic and isophthalic acids. According to an embodiment, the mixture may contain, in weight percent, from about 5% to about 90% isophthalic acid and from about 95% to about 10% by terephthalic acid, preferably from about 10% to about 80% isophthalic acid and from about 90% to about 20% terephthalic acid, and more preferably from about 10% to about 25% isophthalic acid and from about 90% to about 75% terephthalic acid. According to a preferred embodiment, the three component blend comprises from about 35 to 45 wt % PC; from about 33 to 43 wt % PCCD; from about 20 to 35 wt % PCTA.

According to an embodiment, the PCTG type cycloaliphatic polyesters are condensation products of aliphatic diacids, or chemical equivalents and aliphatic diols, or chemical equivalents. The diol component comprises CHDM and an additional diol component such as PCTG for enhancing the clarity of the blend. Typical diol components for condensation reactions include aliphatic diols, such as alkylene diols containing from 2 to about 10 carbon atoms. The hexacarbocyclic dicarboxylic acids which are condensed with the cyclohexanedimethanol and the alkylene diol, such as ethylenen diol, is terephthalic acids.

Polycarbonate resins useful in preparing the blends of the present invention are generally aromatic polycarbonate resins.

Typically these are prepared by reacting a dihydric phenol with a carbonate precursor, such as phosgene, a haloformate or a carbonate ester. Generally speaking, such carbonate polymers may be typified as possessing recurring structural units of the formula IIIA: —O—Ar—O—(CO)—, wherein Ar is a divalent aromatic radical of derived from dihydric phenol employed in the polymer producing reaction.

Preferably, the carbonate polymers used to provide the resinous mixtures of the invention have an intrinsic viscosity (as measured in methylene chloride at 25° C.) ranging from about 0.30 to about 1.00 dl/g.

The dihydric phenol which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are: 2,2-bis(4-hydroxyphenyl) propane; hydroquinone; resorcinol; 2,2-bis(4-hydroxyphenyl) pentane; 2,4'-(dihydroxydiphenyl) methane; bis(2hydroxyphenyl) methane; bis(4 -hydroxyphenyl) methane; bis(4-hydroxy-5-nitrophenyl)methane; 1,1-bis(4-hydroxyphenyl)ethane; 3,3-bis(4-hydroxyphenyl)pentane; 2,2-dihydroxydiphenyl; 2,6-dihydroxynaphthalene; bis(4-hydroxydiphenyl)sulfone; bis(3,5-diethyl-4-hydroxyphenyl) sulfone; 2,2-bis(3,5-dimethyl-4-hydroxyphenyl)propane; 2,4'-dihydroxydiphenyl sulfone; 5'-chloro-2,4'-dihydroxydiphenyl sulfone; bis-(4hydroxyphenyl)diphenyl sulfone; 4,4'-dihydroxydiphenyl ether; 4,4'-dihydroxy-3,3'-dichlorodiphenyl ether; 4,4-dihydroxy-2,5-dihydroxydiphenyl ether; and the like.

Other dihydric phenols which are also suitable for use in the preparation of the above polycarbonates are disclosed in U.S. Pat Nos. 2,999,835; 3,038,365; 3,334,154; and 4,131,575.

These aromatic polycarbonates can be manufactured by known processes, such as, for example and as mentioned above, by reacting a dihydric phenol with a carbonate precursor, such as phosgene, in accordance with methods set forth in the above-cited literature and in U.S. Pat. No. 4,123,436, or by transesterification processes such as are disclosed in U.S. Pat. No. 3,153,008, as well as other processes known to those skilled in the art.

It is also possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer is desired for use in the preparation of the polycarbonate mixtures of the invention. Branched polycarbonates are also useful, such as are described in U.S. Pat. No. 4,001,184. Also, there can be utilized blends of linear polycarbonate and a branched polycarbonate. Moreover, blends of any of the above materials may be employed in the practice of this invention to provide the aromatic polycarbonate.

The preferred aromatic carbonate for use in the practice in the present invention is a homopolymer, e.g., a homopolymer derived from 2,2-bis(4-hydroxyphenyl)propane (bisphenol-A), commercially available under the trade designation LEXAN Registered ™ from General Electric Company.

Additionally, additives such as antioxidants, thermal stabilizers, mold release agents, antistatic agents, whitening agents, colorants, plasticizers, minerals such as talc, clay, mica, barite, wollastonite and other stabilizers including but not limited to UV stabilizers, such as benzotriazole, supplemental reinforcing fillers such as flaked or milled glass, and the like, flame retardants, pigments, additional resins or combinations thereof may be added to the compositions of the present invention. The different additives that can be incorporated in the compositions are commonly used and known to one skilled in the art. Illustrative descriptions of such additives may be found in R. Gachter and H. Muller, Plastics Additives Handbook, 4th edition, 1993.

Examples of thermal stabilizers include triphenyl phosphite, tris-(2,6-dimethylphenyl)phosphite, tris-(2,4-di-t-butyl-phenyl) phosphite, tris-(mixed mono-and di-nonylphenyl)phosphite, dimethylbenzene phosphonate and trimethyl phosphate. Examples of antioxidants include octadecyl-3-(3,5-di-tert-butyl-4-hydroxyphenyl)propionate, and pentaerythrityl-tetrakis[3-(3,5-di-tert-butyl-4-hydroxyphenyl)propionate]. Examples of light stabilizers include 2-(2-hydroxy-5-methylphenyl)benzotriazole, 2-(2-hydroxy-5-tert-octylphenyl)-benzotriazole and 2-hydroxy-4-n-octoxy benzophenone. Examples of plasticizers include dioctyl-4,5-epoxy-hexahydrophthalate, tris-(octoxycarbonylethyl) isocyanurate, tristearin and epoxidized soybean oil. Examples of the antistatic agents include glycerol monostearate, sodium stearyl sulfonate, and sodium dodecylbenzenesulfonate.

A preferred class of stabilizers including quenchers are those which provide a transparent/translucent and colorless product. Typically, such stabilizers are used at a level of 0.001–10 weight percent and preferably at a level of from 0.005–2 weight percent. The favored stabilizers include an effective amount of an acidic phosphate salt; an acid, alkyl, aryl or mixed phosphite having at least one acidic hydrogen; a Group IB or Group IIB metal phosphate salt; a phosphorus oxo acid, a metal acid pyrophosphate or a mixture thereof. The suitability of a particular compound for use as a stabilizer and the determination of how much is to be used as a stabilizer may be readily determined by preparing a mixture of the polyester resin component and the polycarbonate and determining the effect on melt viscosity, gas generation or color stability or the formation of interpolymer. The acidic phosphate salts include sodium dihydrogen phosphate, mono zinc phosphate, potassium hydrogen phosphate, calcium dihydrogen phosphate and the like. The phosphites may be of the formula V:

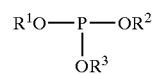

where R1, R2 and R3 are independently selected from the group consisting of hydrogen, alkyl and aryl with the proviso that at least one of R1, R2 and R3 is hydrogen.

The phosphate salts of a Group IB or Group IIB metal include zinc phosphate and the like. The phosphorus oxo acids include phosphorous acid, phosphoric acid, polyphosphoric acid or hypophosphorous acid.

The polyacid pyrophosphates may be of the formula VI:

wherein M is a metal, x is a number ranging from 1 to 12 and y is a number ranging from 1 to 12, n is a number from 2 to 10, z is a number from 1 to 5 and the sum of (xz)+y is equal to n+2. The preferred M is an alkaline or alkaline earth metal.

The most preferred quenchers are oxo acids of phosphorus or acidic organo phosphorus compounds. Inorganic acidic phosphorus compounds may also be used as quenchers, however they may result in haze or loss of clarity. Most preferred quenchers are phosphoric acid, phosphorous acid or their partial esters.

Examples of mold releasing agents, include pentaerythritol tetrastearate, stearyl stearate, beeswax, montan wax, and paraffin wax. Examples of other resins include but are not limited to polypropylene, polystyrene, polymethyl methacrylate, and polyphenylene oxide. Combinations of any of the foregoing additives may be used. Such additives may be mixed at a suitable time during the mixing of the components for forming the composition.

The production of the compositions may utilize any of the blending operations known for the blending of thermoplastics, for example blending in a kneading machine such as a Banbury mixer or an extruder. The sequence of addition is not critical but all components should be thoroughly blended.

To prepare the resin composition, the components may be mixed by any known methods. Typically, there are two distinct mixing steps: a premixing step and a melt mixing step. In the premixing step, the dry ingredients are mixed together. The premixing step is typically performed using a tumbler mixer or ribbon blender. However, if desired, the premix may be manufactured using a high shear mixer such as a Henschel mixer or similar high intensity device. The premixing step is typically followed by a melt mixing step in which the premix is melted and mixed again as a melt. Alternatively, the premixing step may be omitted, and raw materials may be added directly into the feed section of a melt mixing device, preferably via multiple feeding systems. In the melt mixing step, the ingredients are typically melt kneaded in a single screw or twin screw extruder, a Banbury mixer, a two roll mill, or similar device.

The glass transition temperature of the preferred blend is from about 60° C. to about 150° C., more preferably from 120° C. to about 150° C.

The optical properties and impact resistance of the composition make it suitable for use in building and construction industries, especially for use in a variety of glazing applications, for example, roofs, greenhouses, sun rooms, swimming pool enclosures, and the like.

The composition may be shaped into a final article by various techniques known in the art such as injection molding, extrusion, gas assist blow molding, or vacuum forming. A desirable form is an extruded sheet, including solid sheets, multi-wall sheets, and profiled sheets. There is no particular limitation on the composition of additional layers used to form coextruded sheets. There is no particular limitation on the structure or geometry of the multi-wall sheets. The additional layers may comprise, for example, fluorescing agents to facilitate manufacturing and/or ultraviolet light absorbers to improve weatherability. The extruded solid sheets typically have a weight from about 0.5 to about 15 kilograms per square meter, and typically have a thickness from about 0.5 mm to about 15 mm, preferably from about 1 mm to about 12 mm. The extruded multi-wall sheets typically have a weight from about 0.5 to about 8 kilograms, and typically have a thickness of about 2 to about 50 mm, preferable from about 4 to about 40 mm.

EXAMPLES

Figure 1B:
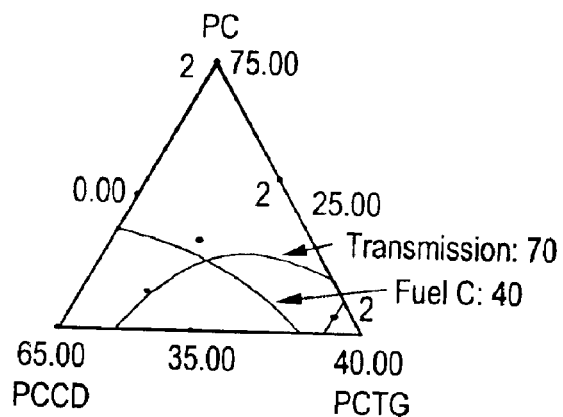
Figure 1C:
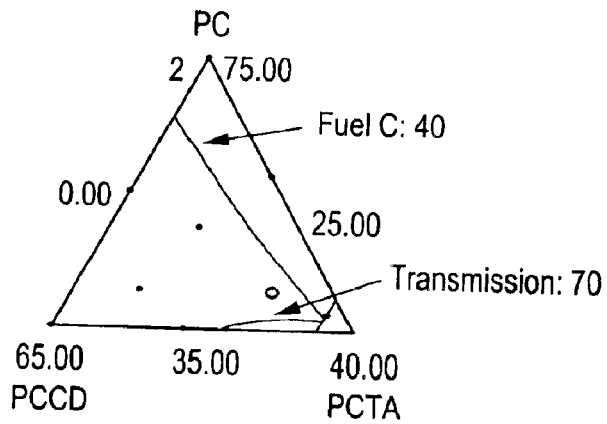

The following examples employed the materials listed in Table 1 according to the formulations listed in Tables 2–4. All amounts are weight percents based on the total weight of the composition unless otherwise indicated. All ingredients were mixed in a ribbon blender and extruded on a Werner-Pleiderer twin screw extruder at 260° C. to form pellets. The pellets were then fed into an injection moulding machine to mould discs-test bars. From the tables and FIG. 1, the three component blend of PC, PCCD, PCTA gives a large compositional space having the desired properties. As shown in FIG. 1, when the third component is PCT, there is no clear blend shown on the three component diagram that has the desired properties. As shown in FIG. 1, when the diol component CHDM additional includes the diol EG, the compositional space having the desired properties is reduced.

Table 2 Test Procedures

Optical properties (transmission and haze are measured according ASTM D1003.

Yellowness index is determined according ASTM D1925 where 3.2 mm thick plaques are measured on a Gardner XL-835 Colorimeter.

Impact values are measured on 4 mm thick bars according ISO 180/1A.

From the granulate, the melt volume rate (MVR) was measured according ISO 1133 (265° C./2.16 kg, unless otherwise stated) in units of $cm^3/10$ min.

Vica B120 temperatures are measured on 4 mm thick bars according ISO 306.

Tensile Properties: The testing procedure follows the ISO 527 standard. The test is carried out on a Zwick 1474 (+HASY). This machine is equipped with an automatic handling system. Tensile bars of type MPTS (ISO 3167) with the following dimensions were used: width of 10 mm and thickness of 4 mm.

Chemical Resistance: Chemical resistance against 4 different chemicals: 1) Fuel C, composition: 42.5% Toluene, 42.5% Iso-octane, 15.0% MeOH; 2)Alcohol; 3) Acetic acid (0.75 vol % in water); and 4) Caustic soda (1.0 wt % in water). The test is carried out according to ISO 4599. The following test conditions are used: Duration of the test: 15 min; Test temperature: 23° C.; Applied constant strain: 0.5%; The method of contact: complete soak. After the test the tensile bars were inspected visually on change in appearance according to the following classification: 1) No visual change; 2) Dull surface; 3) Little cracks or crazes; 4) Large cracks; 5) Break of testing bar. After the visual inspection the tensile test procedure according to the ISO 527 standard was performed to determine the physical properties. Notched Izod: This test procedure is based on the ASTM D256 method. In this case, using Izod Method E, the unnotched impact strength is obtained by testing an unnotched specimen. The results of the test is reported in terms of energy absorbed per unit of specimen width, and expressed in foot times pounds per inch (Ft.Lbs./In.). Typically the final test result is calculated as the average of test results of five test bars.

Dynatup impact test: This test procedure is based on the ASTM D3763 method. This procedure provides information on how a material behaves under multiaxial deformation conditions. The deformation applied is a high speed puncture. An example of a supplier of this type of testing equipment is Dynatup. Reported as the test result is the so-called total energy absorbed (TE), which is expressed in foot times pounds (Ft.Lbs.). The final test result is calculated as the average of the test results of typically ten test plaques.

Melt viscosity: This test procedure is based on the ASTM D1238 method. The equipment used is an extrusion plastometer equipped with an automatic timer. A typical example of this equipment would be the Tinius Olson MP 987. Before testing, the samples are dried for one hour at 150° C. The testing conditions are a melt temperature of 266° C., a total load of 5,000 gram, an orifice diameter of 0.0825 inch, and a dwell time of 5 minutes. The test result is expressed in the unit Poise.

Flexural Modulus: This test procedure is based on the ASTM D790 method. Typical test bars have the following dimensions: ⅛ inch times ½ inch times 2-½ inch. The final test result is calculated as the average of test results of five test bars. The test involves a three point loading system utilizing center loading on a simply supported beam.

Instron and Zwick are typical examples of manufacturers of instruments designed to perform this type of test. The flexural modulus is the ratio, within the elastic limit, of stress to corresponding strain and is expressed in pounds per square inch (psi).

Tensile Strength: This test procedure is based on the ASTM D638 method. Test bars in the form of the standard dumbbell shape are used in this test method. The final test result is calculated as the average of the test results of five test bars. The tensile strength is calculated by dividing the maximum load observed in the test by the original minimum cross-sectional area of the test specimen. The result is expressed in pounds per square inch (psi). Instron and Zwick are typical examples of manufacturers of instruments designed to perform this type of test.

Tensile Elongation: The ability of a material to resist breaking under tensile stress is based upon ASTM D638. Samples are generally injection molded. The tensile testing machine pulls the sample from both ends and measures the force required to pull the specimen apart and how much the sample stretches before breaking. The ultimate elongation of a plastic is the percentage increase in length that occurs before it breaks under tension.

TABLE 3

| Formulations [%] | | −5 | −3 | −13 | −14 | −8 | −1 |
|---|---|---|---|---|---|---|---|
| PC | | 57.28% | 57.28% | 57.28% | 57.28% | 49.81% | 48.15% |
| PCCD | X2873/X2874 | 24.91% | 24.91% | 24.91% | 24.91% | 38.19% | 39.85% |
| PCTA | Eastar A150 | 17.43% | | | | 11.62% | |
| PCT | Ektar 13787 | | 17.43% | | | | 11.62% |
| PCTG | Eastar 5445 | | | 17.43% | 17.43% | | |
| PETG | Eastar 6763 | | | | | | |
| MZP | | 0.06% | 0.06% | 0.06% | 0.06% | 0.06% | 0.06% |
| PEPQ | | 0.32% | 0.32% | 0.32% | 0.32% | 0.32% | 0.32% |
| Ph 168 | | | | | | | |
| Irg 1076 | | | | | | | |
| H3PO3 | | | | | | | |
| | Polyester/Polyester + PC | 43% | 43% | 43% | 43% | 50% | 52% |
| | Total | 100.00% | 100.00% | 100.00% | 100.00% | 100.00% | 100.00% |
| Test Results: | | | | | | | |
| Initial Color | Standaard L | | | | | | 75.87 |
| Transmission | (Engel 1) A | | | | | | 1.19 |
| (if opaque) | B | | | | | | 8.47 |
| Initial Color | Standaard L | 92.79 | 83.26 | 93.15 | 92.08 | 92.84 | |
| Reflection | (Engel 1) A | 0.04 | 1.37 | −0.17 | −0.09 | 0.16 | |
| (if transparent) | B | 4.45 | 13.22 | 5.68 | 6.14 | 4.22 | |
| Transmission in % | T | 86.6 | 57.3 | 86.3 | 86.7 | 84.4 | 60.1 |
| | "haze" | 3.6 | 63.3 | 5.7 | 3.0 | 8.0 | 62.6 |
| Initial Gloss | 20 deg | 145.2 | 23.8 | 157.4 | 130.1 | 141.2 | 17.6 |
| | 60 deg | 133.1 | 74.3 | 141 | 129.1 | 125.5 | 68.7 |
| MVR (ml/10$^2$) | 250° C./5 kg | | | | | | |
| | 265° C./2.16 kg | 14.21 | 7.36 | 15.06 | 11.10 | 16.94 | 10.04 |
| | 265° C./5 kg | | | | | | |
| Vicat B120 | ° C. | 113.9 | 116.7 | 112.1 | 113.6 | 104.8 | 105.8 |
| HDT Ae1.80 | ° C. | 88.2 | 90.4 | 88.4 | 88.3 | | 80.3 |
| Tensile | modulus (Mpa) | 1990.5 | 1973.9 | 1992.3 | 1995.8 | 1810.3 | 1852.0 |
| | yield strength (Mpa) | 55.8 | 55.6 | 55.8 | 55.2 | 52.4 | 52.6 |
| | yield at break (Mpa) | 122.7 | 127.6 | 154.8 | 155.7 | 145.7 | 142.2 |
| | elong at break (%) | 52.0 | 52.1 | 56.8 | 58.3 | 49.8 | 49.3 |
| Notched Izod | 23° C. gem | 10.0 | 10.9 | 10.6 | 12.9 | 9.2 | 9.8 |
| Impact | sd | 0.3 | 0.7 | 1.0 | 1.0 | 0.7 | 0.5 |
| Flexplate | Maximum Force (N) | 8607 | 8075 | 7969 | 8350 | 7563 | 8194 |
| 23° C. | Energy at Max. (J) | 73.4 | 58.7 | 77.1 | 78.1 | 75.2 | 74.2 |
| | Energy at break (J) | 123.3 | 102.0 | 120.4 | 124.3 | 101 | 123.1 |
| | Deflection at Break (mm) | 22.7 | 19.8 | 23.1 | 23.3 | 20.3 | 23.7 |
| Flexplate | Maximum Force (N) | 10201 | 9021 | 9184 | 9802 | 9691 | 4382 |
| −20° C. | Energy at Max. (J) | 100.2 | 73.6 | 80.6 | 98.6 | 91.9 | 23.6 |
| | Energy at break (J) | 127.4 | 99 | 109.5 | 126.7 | 118.9 | 31.3 |
| | Deflection at Break (mm) | 22.1 | 20.3 | 20.1 | 21.5 | 21.9 | 9.5 |
| | Failure mode | 4DC | 3DC/1DP | 4DC | 4DC | 4DC | 1DC |
| Fuel C | Classification (1–5) | 5 | 5 | 5 | 5 | 1 | 1 |
| Strain 0.5% | modulus (Mpa) | — | — | — | — | 1784 | 1914 |
| | yield strength (Mpa) | — | — | — | — | 21.6 | 51.6 |
| | yield at break (Mpa) | — | — | — | — | 21.6 | 35.8 |
| | elong at break (%) | — | — | — | — | 1.4 | 6.5 |
| Alcohol | Classification (1–5) | 5 | 5 | 3 | 3 | 5 | 5 |
| Strain 0.5% | modulus (Mpa) | — | — | 2050 | 2050 | — | — |
| | yield strength (Mpa) | — | — | 53.7 | 54.9 | — | — |
| | yield at break (Mpa) | — | — | 53.3 | 54.9 | — | — |
| | elong at break (%) | — | — | 46.1 | 58.8 | — | — |
| Acetic Acid | Classification (1–5) | 1 | 1 | 1 | 1 | 1 | 1 |
| 0.75 vol % in water | modulus (Mpa) | 1985 | 1983.8 | 2008 | 2009 | 1841 | 1778 |
| Strain 0.5% | yield strength (Mpa) | 56 | 52.2 | 55.7 | 55.5 | 52.5 | 52.6 |
| | yield at break (Mpa) | 54.6 | 52.2 | 54.7 | 59.4 | 49.5 | 52.6 |

TABLE 3-continued

|  |  |  |  |  |  |  |  |
|---|---|---|---|---|---|---|---|
| Caustic Soda 1.0 wt % in water Strain 0.5% | elong at break (%) | 145 | 90.3 | 143.4 | 159.9 | 141.9 | 91.7 |
|  | Classification (1–5) | — | 1 | 1 | — | 1 | 1 |
|  | modulus (Mpa) | — | 2035 | 2119 | — | 1916 | 1883 |
|  | yield strength (Mpa) | — | 55.1 | 54.4 | — | 52.2 | 51.8 |
|  | yield at break (Mpa) | — | 48.5 | 51.9 | — | 47.2 | 42.1 |
|  | elong at break (%) | — | 115.8 | 130.1 | — | 135.5 | 106.4 |

| Formulations [%] |  | –18 | –21 | –26 | –23 | –28 | –15 |
|---|---|---|---|---|---|---|---|
| PC |  | 48.15% | 42.96% | 40.47% | 40.47% | 40.47% | 40.47% |
| PCCD | X2873/X2874 | 39.85% | 30.51% | 50.43% | 50.43% | 50.43% | 33.00% |
| PCTA | Eastar A150 |  |  | 8.72% |  |  | 26.15% |
| PCT | Ektar 13787 |  | 26.15% |  | 8.72% |  |  |
| PCTG | Eastar 5445 | 11.62% |  |  |  | 8.72% |  |
| PETG | Eastar 6763 |  |  |  |  |  |  |
| MZP |  | 0.06% | 0.06% | 0.06% | 0.06% | 0.06% | 0.06% |
| PEPQ |  | 0.32% | 0.32% | 0.32% | 0.32% | 0.32% | 0.32% |
| Ph 168 |  |  |  |  |  |  |  |
| Irg 1076 |  |  |  |  |  |  |  |
| H3PO3 |  |  |  |  |  |  |  |
|  | Polyester/Polyester + PC | 52% | 57% | 59% | 59% | 59% | 59% |
|  | Total | 100.00% | 100.00% | 100.00% | 100.00% | 100.00% | 100.00% |
| Test Results: |  |  |  |  |  |  |  |
| Initial Color Transmission (if opaque) | Standaard (Engel 1) L |  | 81.14 |  | 79.75 |  |  |
|  | A |  | –0.58 |  | 0.22 |  |  |
|  | B |  | 0.64 |  | 2.60 |  |  |
| Initial Color Reflection (if transparent) | Standaard (Engel 1) L | 89.77 |  | 90.95 |  | 85.09 | 87.89 |
|  | A | 0.27 |  | 0.31 |  | 0.98 | 0.41 |
|  | B | 8.96 |  | 6.44 |  | 11.65 | 10.68 |
| Transmission in % | T | 77.4 | 44.9 | 81.3 | 57.0 | 69.8 | 75.1 |
|  | "haze" | 14.6 | 96.0 | 17.0 | 91.0 | 29.1 | 15.4 |
| Initial Gloss | 20 deg | 139.9 | 8.9 | 82.7 | 11.3 | 118.1 | 125.2 |
|  | 60 deg | 131.1 | 52.9 | 113.8 | 52.4 | 116.7 | 120.7 |
| MVR (ml/10$^2$) | 250° C./5 kg |  |  |  |  |  |  |
|  | 265° C./2.16 kg | 15.71 |  | 16.56 | 5.34 | 13.15 | 19.38 |
|  | 265° C./5 kg |  |  |  |  |  |  |
| Vicat B120 | ° C. | 105.7 | 112.9 | 94.7 | 98.5 | 98.9 | 98.4 |
| HDT Ae1.80 | ° C. |  | 85.3 | 76.3 | 77.5 | 76.8 | 80 |
| Tensile | modulus (Mpa) | 1799.2 | 1501.5 | 1679.7 | 1543.8 | 1692.8 | 1802.3 |
|  | yield strength (Mpa) | 52.0 | 53.1 | 48.3 | 48.9 | 48.3 | 51.2 |
|  | yield at break (Mpa) | 171.0 | 112.6 | 181.8 | 34.9 | 162.5 | 161.6 |
|  | elong at break (%) | 54.3 | 47.0 | 50.6 | 36.4 | 49.9 | 49.3 |
| Notched Izod Impact | 23° C.  gem | 10.9 | 9.9 | 10.8 | 16.4 | 13.8 | 9.0 |
|  | sd | 0.9 | 0.3 | 1.1 | 13.4 | 4.6 | 3.8 |
| Flexplate 23° C. | Maximum Force (N) | 8392 | 7571 | 7482 | 6160 | 7949 | 7531 |
|  | Energy at Max. (J) | 74.9 | 59.8 | 72.8 | 43 | 73.6 | 69.1 |
|  | Energy at break (J) | 130.9 | 102.5 | 116.4 | 55.8 | 132.9 | 117.6 |
|  | Deflection at Break (mm) | 24.4 | 20.3 | 23.9 | 15.0 | 25.6 | 23.6 |
| Flexplate –20° C. | Maximum Force (N) | 9741 | 6742 | 8807 | 1720 | 9604 | 9685 |
|  | Energy at Max. (J) | 93.5 | 35.7 | 79.7 | 3.1 | 90.8 | 91.5 |
|  | Energy at break (J) | 130.7 | 38.1 | 114.7 | 6.4 | 138 | 126.1 |
|  | Deflection at Break (mm) | 22 | 11.3 | 21.1 | 8.2 | 22.8 | 22 |
|  | Failure mode | 4DC | 4DP | 4DC | 4DP | 4DC | 4DC |
| Fuel C Strain 0.5% | Classification (1–5) | 1 | 1 | 1 | 5 | 1 | 1/4 |
|  | modulus (Mpa) | 1658 | 1765 | 1654 | — | 1790 | 1761 |
|  | yield strength (Mpa) | 15.7 | 49.7 | 44.2 | — | 47.4 | 48.1 |
|  | yield at break (Mpa) | 15.7 | 44.7 | 46.1 | — | 44 | 44.2 |
|  | elong at break (%) | 1.0 | 118.1 | 167.1 | — | 151.3 | 125.4 |
| Alcohol Strain 0.5% | Classification (1–5) | 3 | 5 | 5 | 5 | 5 | 3 |
|  | modulus (Mpa) | 1902 | — | — | — | — | 1864 |
|  | yield strength (Mpa) | 51.6 | — | — | — | — | 50.5 |
|  | yield at break (Mpa) | 51.6 | — | — | — | — | 50.5 |
|  | elong at break (%) | 98.2 | — | — | — | — | 37.8 |
| Acetic Acid 0.75 vol % in water Strain 0.5% | Classification (1–5) | 1 | 1 | 1 | 1 | 1 | 1 |
|  | modulus (Mpa) | 1832 | 2093 | 1596 | 1864 | 1692 | 1820 |
|  | yield strength (Mpa) | 51.9 | 53.2 | 49.1 | 49.5 | 48.8 | 51.5 |
|  | yield at break (Mpa) | 52.6 | 48.2 | 51.2 | 41.2 | 49.8 | 51 |
|  | elong at break (%) | 183.8 | 64.7 | 152.7 | 54.4 | 150.4 | 165.5 |
| Caustic Soda 1.0 wt % in water Strain 0.5% | Classification (1–5) | 1 | 1 | 1 | 1 | 1 | 1 |
|  | modulus (Mpa) | 1919 | 1811 | 1821 | 1550 | 1808 | 1857 |
|  | yield strength (Mpa) | 51.5 | 52.2 | 48.2 | 46.8 | 50.2 | 50.9 |

TABLE 3-continued

| | | | | | | | |
|---|---|---|---|---|---|---|---|
| yield at break (Mpa) | 48.8 | 49.3 | 46.9 | 34.2 | 49.6 | 48.3 |
| elong at break (%) | 144.3 | 120.6 | 151.9 | 36.6 | 171.7 | 151.8 |

TABLE 4

| Formulations [%] | | | -18 | -7 | -27 | -2 | -6 | -11 |
|---|---|---|---|---|---|---|---|---|
| PC | | | | 37.36% | 37.36% | 37.36% | 34.87% | 34.87% | 34.87% |
| PCCD | X2873/X2874 | | | 27.40% | 27.40% | 27.40% | 47.32% | 47.32% | 47.32% |
| PCTA | Eastar A150 | | 34.87% | | | | 17.43% | |
| PCT | Ektar 13787 | | | | | | | 17.43% | |
| PCTG | Eastar 5445 | | | | 34.87% | 34.87% | | | 17.43% |
| PETG | Eastar 6763 | | | | | | | | |
| MZP | | | | 0.06% | 0.06% | 0.06% | 0.06% | 0.06% | 0.06% |
| PEPQ | | | | 0.32% | 0.32% | 0.32% | 0.32% | 0.32% | 0.32% |
| Ph 168 | | | | | | | | | |
| Irg 1076 | | | | | | | | | |
| H3PO3 | | | | | | | | | |
| | Polyester/Polyester + PC | | 63% | 63% | 63% | 65% | 65% | 65% |
| | Total | | 100.00% | 100.00% | 100.00% | 100.00% | 100.00% | 100.00% |
| Test Results: | | | | | | | | |
| Initial Color | Standaard | L | | 82.51 | 82.27 | | 79.44 | 79.44 |
| Transmission | (Engel 1) | A | | 2.1 | 1.82 | | -0.34 | 0.99 |
| (if opaque) | | B | | 4.89 | 5.11 | | 4.67 | 1.61 |
| Initial Color | Standaard | L | 87.02 | | | 86.06 | | |
| Reflection | (Engel 1) | A | 0.61 | | | 0.57 | | |
| (if transparent) | | B | 12.68 | | | 10.25 | | |
| Transmission in % | | T | 71.2 | 56.6 | 57.6 | 71.6 | 36.5 | 52.4 |
| | | "haze" | 15.4 | 42.2 | 44.9 | 29.4 | 40.9 | 60.1 |
| Initial Gloss | | 20 deg | 134.6 | 111.1 | 105 | 113.8 | 4.7 | 98.3 |
| | | 60 deg | 134.8 | 117.1 | 114.1 | 115.9 | 28.6 | 106.1 |
| MVR (ml/10$^2$) | | 250° C./5 kg | | | | | | |
| | | 265° C./2.16 kg | 12.16 | 14.48 | 15.71 | 20.34 | 4.30 | 19.65 |
| | | 265° C./5 kg | | | | | | |
| Vicat B120 | | ° C. | 100.8 | 98.2 | 98.6 | 94.2 | 98.0 | 94.0 |
| HDT Ae1.80 | | ° C. | 78.8 | 76.7 | 79.8 | 70.4 | | 72.5 |
| Tensile | | modulus (Mpa) | 1776.5 | 1854.7 | 1793.3 | 1697.4 | 1649.3 | 1594.1 |
| | | yield strength (Mpa) | 50.0 | 51.1 | 50.4 | 48.0 | 48.1 | 52.1 |
| | | yield at break (Mpa) | 160.4 | 160.3 | 158.3 | 167.5 | 4.6 | 201.8 |
| | | elong at break (%) | 52.8 | 48.3 | 49.0 | 44.3 | 48.1 | 50.3 |
| Notched Izod | 23° C. | gem | 12.0 | 10.7 | 10.8 | 9.2 | 6.7 | 12.0 |
| Impact | | sd | 1.5 | 1.0 | 0.9 | 4.0 | 0.3 | 0.4 |
| Flexplate | | Maximum Force (N) | 8085 | 8085 | 8038 | 6799 | 1067 | 7195 |
| 23° C. | | Energy at Max. (J) | 104.5 | 69.7 | 74.3 | 42.9 | 2 | 66.9 |
| | | Energy at break (J) | 130.5 | 124.5 | 129.7 | 77.5 | 3.5 | 109.9 |
| | | Deflection at Break (mm) | 25.4 | 23.6 | 24.8 | 18 | 6.3 | 23.5 |
| Flexplate | | Maximum Force (N) | 9852 | 9825 | 9728 | 7526 | 824 | 7860 |
| -20° C. | | Energy at Max. (J) | 93.1 | 93.9 | 91.8 | 58.2 | 2.5 | 65.6 |
| | | Energy at break (J) | 128.5 | 133.5 | 134.9 | 81.1 | 3.1 | 102.2 |
| | | Deflection at Break (mm) | 22.1 | 22.5 | 22.3 | 16.7 | 7.2 | 19.1 |
| | | Failure mode | 4DC | 4DC | 4DC | 2DC/2DP | 4BP | 3DC/1BP |
| Fuel C | | Classification (1–5) | 5 | 1 | 1 | 1 | 1 | 1 |
| Strain 0.5% | | modulus (Mpa) | — | 1763 | 1732 | 1794 | 1994 | 1687 |
| | | yield strength (Mpa) | — | 47.7 | 18.4 | 48.1 | — | 44.9 |
| | | yield at break (Mpa) | — | 46.1 | 18.3 | 35.9 | 0.6 | 42.8 |
| | | elong at break (%) | — | 4.9 | 1.2 | 59.3 | 9.6 | 127.3 |
| Alcohol | | Classification (1–5) | 3 | 5 | 5 | No | 5 | 3 |
| Strain 0.5% | | modulus (Mpa) | 1874 | — | — | samples | — | 1747 |
| | | yield strength (Mpa) | 50 | — | — | — | — | 46 |
| | | yield at break (Mpa) | 50.9 | — | — | — | — | 46.9 |
| | | elong at break (%) | 140.5 | — | — | — | — | 82.4 |
| Acetic Acid | | Classification (1–5) | 1 | 1 | 1 | No | 1 | 1 |
| 0.75 vol % in water | | modulus (Mpa) | 1806 | 1850 | 1975 | Samples | 1693 | 1712 |
| Strain 0.5% | | yield strength (Mpa) | 50.9 | 51.4 | 51.2 | — | 46.6 | 48.5 |
| | | yield at break (Mpa) | 49.5 | 46.6 | 51.5 | — | 46.6 | 49.6 |
| | | elong at break (%) | 142.9 | 153.4 | 162.7 | — | 3.9 | 196.9 |
| Caustic Soda | | Classification (1–5) | — | — | 1 | — | 1 | 1 |
| 1.0 wt % in water | | modulus (Mpa) | — | — | 1929 | — | 1783 | 1749 |
| Strain 0.5% | | yield strength (Mpa) | — | — | 50.9 | — | 47.7 | 48 |

TABLE 4-continued

|  |  |  |  |  |  |  |  |
|---|---|---|---|---|---|---|---|
|  | yield at break (Mpa) | — | — | 49.0 | — | 47.7 | 46 |
|  | elong at break (%) | — | — | 164.8 | — | 4.1 | 174.8 |
| Formulations [%] |  | -31 | -19 | -38 | -40 | -41 | -42 |
| PC |  | 34.87% | 99.60% | 69.62% | 59.67% | 49.73% | 69.62% |
| PCCD | X2873/X2874 | 29.89% |  |  |  |  |  |
| PCTA | Eastar A150 |  |  |  |  |  |  |
| PCT | Ektar 13787 | 34.67% |  | 29.84% | 39.78% | 49.73% |  |
| PCTG | Eastar 5445 |  |  |  |  |  |  |
| PETG | Eastar 6763 |  |  |  |  |  | 29.64% |
| MZP |  |  | 0.06% |  |  |  |  |
| PEPQ |  |  | 0.32% |  |  |  |  |
| Ph 168 |  |  |  | 0.20% | 0.20% | 0.20% | 0.20% |
| Irg 1076 |  |  |  | 0.20% | 0.20% | 0.20% | 0.20% |
| H3PO3 |  |  |  | 0.15% | 0.15% | 0.15% | 0.15% |
|  | Polyester/Polyester + PC | 65% |  |  |  |  |  |
|  | Total | 100.00% | 100.00% | 100.00% | 100.00% | 100.00% | 100.00% |
| Test Results: |  |  |  |  |  |  |  |
| Initial Color | Standaard L | 84.42 | 93.36 | 41.93 | 41.93 | 42.89 | 47.01 |
| Transmission | (Engel 1) A | -1.49 | -0.18 | 0.14 | 0.3 | 0.19 | -0.68 |
| (if opaque) | B | 6.29 | 3.21 | 0.43 | 0.78 | -2.64 | -1.27 |
| Initial Color | Standaard L |  | 97.2 | 93.61 | 94.18 | 90.78 | 89.05 |
| Reflection | (Engel 1) A |  | 0.31 | 0.49 | 0.45 | 0.81 | 1.06 |
| (if transparent) | B |  | 0.42 | 4.06 | 4.5 | 8 | 4.85 |
| Transmission in % | T | 35.7 | 91.2 | 82 | 83.7 | 77 | 74.1 |
|  | "haze" | 99.2 | 2.38 | 12.4 | 7.37 | 13.4 | 16.8 |
| Initial Gloss | 20 deg | 6.8 | 179.9 | 152.3 | 162.5 | 145.8 | 145.7 |
|  | 60 deg | 34.6 | 164.8 | 134.7 | 139.9 | 137.4 | 133.8 |
| MVR (ml/10$^2$) | 250° C./5 kg |  | 3.8 | 5.19 |  |  | 20.6 |
|  | 265° C./2.16 kg |  |  |  |  |  |  |
|  | 265° C./5 kg |  |  |  | 12.36 | 5.94 |  |
| Vicat B120 | ° C. | 106.7 | 146.5 | 126.8 | 121.5 | 116.5 | 116 |
| HDT Ae1.80 | ° C. |  | 127.7 | 106.0 | 100.8 | 94.8 | 100.8 |
| Tensile | modulus (Mpa) | 1881.0 | 2312 | 2101 | 2049 | 1966 | 2366 |
|  | yield strength (Mpa) | 53.8 | 61.9 | 59.2 | 57.6 | 55.6 | 64.3 |
|  | yield at break (Mpa) | 116.5 | 70.9 | 60.6 | 58.5 | 56.5 | 64.3 |
|  | elong at break (%) | 47.9 | 126.3 | 121.7 | 122.6 | 132.3 | 112.8 |
| Notched Izod | 23° C. gem | 8.6 | 73.3 | 52.3 | 64.1 | 74.1 | 8.5 |
| Impact | sd | 0.3 | 1.1 | 27.7 | 25.7 | 3.7 | 0.4 |
| Flexplate | Maximum Force (N) | 8358 | 10923 | 7683 | 9164 | 8867 | 9025 |
| 23° C. | Energy at Max. (J) | 71.3 | 131 | 113.3 | 107.3 | 104.9 | 94.7 |
|  | Energy at break (J) | 122.4 | 137.7 | 122.7 | 122.7 | 121.9 | 129.2 |
|  | Deflection at Break (mm) | 23.4 | 23.1 | 17.9 | 22.1 | 22.4 | 22.5 |
| Flexplate | Maximum Force (N) | 9236 | 10487 |  |  |  |  |
| -20° C. | Energy at Max. (J) | 76 | 118.5 |  |  |  |  |
|  | Energy at break (J) | 101.7 | 123.6 |  |  |  |  |
|  | Deflection at Break (mm) | 19.2 | 20.3 |  |  |  |  |
|  | Failure mode | 3DC/1B | 4DC |  |  |  |  |
| Fuel C | Classification (1–5) | 1 | 2 * 3 2 * 5 | 5 | 3 | 3 | 5 |
| Strain 0.5% | modulus (Mpa) | 1901 | 1987 | — | 2156 | 2093 | — |
|  | yield strength (Mpa) | 50.6 | 0 | — | 0 | 0 | — |
|  | yield at break (Mpa) | 41.1 | 23.2 | — | 25.5 | 37.5 | — |
|  | elong at break (%) | 98.3 | 1.4 | — | 1.4 | 2.2 | — |
| Alcohol | Classification (1–5) | 5 |  |  |  |  |  |
| Strain 0.5% | modulus (Mpa) | — |  |  |  |  |  |
|  | yield strength (Mpa) | — |  |  |  |  |  |
|  | yield at break (Mpa) | — |  |  |  |  |  |
|  | elong at break (%) | — |  |  |  |  |  |
| Acetic Acid | Classification (1–5) | 1 |  |  |  |  |  |
| 0.75 vol % in water | modulus (Mpa) | 1838 |  |  |  |  |  |
| Strain 0.5% | yield strength (Mpa) | 49.7 |  |  |  |  |  |
|  | yield at break (Mpa) | 43.0 |  |  |  |  |  |
|  | elong at break (%) | 136.5 |  |  |  |  |  |
| Caustic Soda | Classification (1–5) | — |  |  |  |  |  |
| 1.0 wt % in water | modulus (Mpa) | — |  |  |  |  |  |
| Strain 0.5% | yield strength (Mpa) | — |  |  |  |  |  |
|  | yield at break (Mpa) | — |  |  |  |  |  |
|  | elong at break (%) | — |  |  |  |  |  |

TABLE 5

| Formulations [%] | | -43 | -44 | -45 | -46 | -47 | -48 | -49 | -50 |
|---|---|---|---|---|---|---|---|---|---|
| PC | | 59.67% | 49.73% | 69.62% | 59.87% | 49.73% | 69.62% | 59.67% | 49.73% |
| PCCD | X2873/X2874 | | | | | | | | |
| PCTA | Eastar A150 | | | | | | | 29.84% | 39.78% | 49.73% |
| PCT | Ektar 13787 | | | | | | | | |
| PCTG | Eastar 5445 | | | 29.84% | 39.78% | 49.73% | | | |
| PETG | Eastar 6763 | 39.78% | 49.73% | | | | | | |
| MZP | | | | | | | | | |
| PEPQ | | | | | | | | | |
| Ph 168 | | 0.20% | 0.20% | 0.20% | 0.20% | 0.20% | 0.20% | 0.20% | 0.20% |
| Irg 1076 | | 0.20% | 0.20% | 0.20% | 0.20% | 0.20% | 0.20% | 0.20% | 0.20% |
| H3PO3 | | 0.15% | 0.15% | 0.15% | 0.15% | 0.15% | 0.15% | 0.15% | 0.15% |
| | Polyester/Polyester + PC | | | | | | | | |
| | Total | 100.00% | 100.00% | 100.00% | 100.00% | 100.00% | 100.00% | 100.00% | 100.00% |
| Test Results: | | | | | | | | | |
| Initial Color | Standaard L | 57.85 | 58.62 | 42.38 | 42.36 | 41.38 | 42.04 | 42.15 | 41.81 |
| Transmission | (Engel 1) A | -1.76 | -1.76 | 0.26 | 0.23 | 0.24 | 0.24 | 0.26 | 0.27 |
| (if opaque) | B | -0.03 | -0.03 | -0.26 | -0.37 | 0.15 | 0.1 | -0.06 | 0.18 |
| Initial Color | Standaard L | 82.57 | 83.34 | 96.87 | 97 | 94.22 | 89.13 | 80.64 | 80.89 |
| Reflection | (Engel 1) A | 1.57 | 1.46 | 0.27 | 0.2 | 0.44 | 0.36 | 0.34 | 0.38 |
| (if transparent) | B | 4.48 | 3.94 | 0.86 | 0.76 | 2.54 | 1.95 | 1.56 | 1.95 |
| Transmission in % | T | 60.6 | 60 | 88.9 | 89.3 | 83 | 86.7 | 88.4 | 87.4 |
| | "haze" | 47.1 | 65.9 | 3.23 | 2.41 | 9.56 | 5.88 | 4.43 | 4.54 |
| Initial Gloss | 20 deg | 117.7 | 96.4 | 178.2 | 179.3 | 150.9 | 170.8 | 171 | 163.7 |
| | 60 deg | 114.3 | 108.5 | 148.1 | 159.2 | 143 | 155.4 | 162.4 | 149.3 |
| MVR (ml/10$^2$) | 250° C./5 kg | 26.6 | 43.1 | 14.2 | 16.7 | 21.7 | 12.5 | 13.0 | 13.2 |
| | 265° C./2.16 kg | | | | | | | | |
| | 265° C./5 kg | | | | | | | | |
| Vicat B120 | ° C. | 114.1 | 101.2 | 121.8 | 114.8 | 107.9 | 123.3 | 117.3 | 111.9 |
| HDT Ae1.80 | ° C. | 97.7 | 84.5 | 102.1 | 95.7 | 90.3 | 105.2 | 99 | 92.9 |
| Tensile | modulus (Mpa) | 2390 | 2150 | 2071 | 2412 | 2254 | 2214 | 2218 | 2272 |
| | yield strength (Mpa) | 64.2 | 59.8 | 57.8 | 71.6 | 68.4 | 67.5 | 62.3 | 62.5 |
| | yield at break (Mpa) | 64.2 | 61.1 | 58.1 | 71.6 | 68.4 | 68.1 | 62.3 | 62.5 |
| | elong at break (%) | 91.7 | 133.5 | 134.5 | 97 | 113.4 | 117.4 | 124.2 | 122.5 |
| Notched Izod | 23° C. gem | 8.4 | 7.4 | 10.5 | 9 | 5.9 | 11.2 | 10.9 | 10 |
| Impact | sd | 0.4 | 0.5 | 0.3 | 3.6 | 3.7 | 0.5 | 0.2 | 0.4 |
| Flexplate | Maximum Force (N) | 8469 | 6497 | 9065 | 8842 | 8575 | 9292 | 9275 | 9184 |
| 23° C. | Energy at Max. (J) | 78.6 | 57 | 88.9 | 84.2 | 80.3 | 107 | 98.7 | 104.5 |
| | Energy at break (J) | 121.1 | 83.2 | 127.2 | 125.2 | 127.6 | 128.4 | 131.3 | 138 |
| | Deflection at Break (mm) | 22.1 | 17.9 | 22 | 22.1 | 22.8 | 22.2 | 22.7 | 23.5 |
| Flexplate | Maximum Force (N) | | | | | | | | |
| -20° C. | Energy at Max. (J) | | | | | | | | |
| | Energy at break (J) | | | | | | | | |
| | Deflection at Break (mm) | | | | | | | | |
| | Failure mode | | | | | | | | |
| Fuel C | Classification (1–5) | 5 | 5 | 5 | 5 | 5 | 5 | 5 | 3 * 4 1 * 5 |
| Strain 0.5% | modulus (Mpa) | — | — | — | — | — | — | — | 1932 |
| | yield strength (Mpa) | — | — | — | — | — | — | — | 0 |
| | yield at break (Mpa) | — | — | — | — | — | — | — | 14.8 |
| | elong at break (%) | — | — | — | — | — | — | — | 0.9 |
| Alcohol | Classification (1–5) | | | | | | | | |
| Strain 0.5% | modulus (Mpa) | | | | | | | | |
| | yield strength (Mpa) | | | | | | | | |
| | yield at break (Mpa) | | | | | | | | |
| | elong at break (%) | | | | | | | | |
| Acetic Acid | Classification (1–5) | | | | | | | | |
| 0.75 vol % in water | modulus (Mpa) | | | | | | | | |
| Strain 0.5% | yield strength (Mpa) | | | | | | | | |
| | yield at break (Mpa) | | | | | | | | |
| | elong at break (%) | | | | | | | | |
| Caustic Soda | Classification (1–5) | | | | | | | | |
| 1.0 wt % in water | modulus (Mpa) | | | | | | | | |
| Strain 0.5% | yield strength (Mpa) | | | | | | | | |
| | yield at break (Mpa) | | | | | | | | |
| | elong at break (%) | | | | | | | | |

What is claimed is:

1. A clear thermoplastic blend comprising a first polycarbonate resin component; a second resin blend component of a first polyester copolymer resin derived from a cycloaliphatic diol or equivalent thereof and a cycloaliphatic dicarboxylic acid or equivalent thereof, and a third resin component of a second polyester polymer resin derived from the condensation of a cyclohexane diol or equivalents thereof with a terephthalic acid or equivalents thereof and an additional condensation reaction component selected from aliphatic or aromatic diacids or diols suitable for enhancing the clarity of said blend wherein the three components are present in proportions for to form a clear blend having a transmission of seventy percent or greater and an elongation at break after exposure to Fuel C of forty percent or greater.

2. A clear thermoplastic blend according to claim 1 comprising a clear blend portion having enhanced chemical resistance as compared to a two component blend of only said first and second blend components.

3. A clear thermoplastic blend according to claim 1 wherein
the blend comprises the first polycarbonate resin component in an amount of 35 to 65 weight percent based on the total weight of the three blend components; and
the blend comprises 33 to 65 weight percent of the second resin blend component, and 2 to 35 weight percent of the third resin component.

4. A clear thermoplastic blend according to claim 3 wherein said third resin component consists essentially of the product of a condensation reaction of a mixture 1,4-cyclohexanedimethanol or equivalents and a terephthalic acid or equivalent, and isophthalic acid or equivalents wherein said isophthalic acid or equivalent is present in said mixture in an amount effective for enhancing the clarity of the three component blend.

5. A clear thermoplastic blend according to claim 3 wherein said third component consists essentially of the condensation reaction of a mixture of 1,4-cyclohexanedimethanol or equivalents and ethylene glycol with terephthalic acid or equivalents wherein said ethylene glycol is present in said mixture in an amount effective for enhancing the clarity of the three component blend.

6. A clear thermoplastic blend according to claim 3 wherein said third resin component consists essentially of PCTA, and said three component blend comprises from 35 to 45 wt % PC as the first component; from about 33 to 43 wt % PCCD as the second component; and from 20 to 35 wt % PCTA.

7. A clear thermoplastic blend according to claim 3 wherein said polycarbonate resin is an aromatic polycarbonate resin.

8. A clear thermoplastic blend according to claim 3 further comprising one or more additional ingredients selected from the group consisting of antioxidants, thermal stabilizers, mold release agents, antistatic agents, whitening agents, colorants, plasticizers, and reinforcing materials.

9. A clear thermoplastic blend according to claim 8 wherein a stabilizer is included in the blend and wherein said stabilizer includes an effective amount of an acidic phosphate salt; an acid, alkyl, aryl or mixed phosphite having at least one acidic hydrogen; a Group IB or Group IIB metal phosphate salt; a phosphorus oxo acid, a metal acid pyrophosphate or a mixture thereof.

10. A clear thermoplastic blend according to claim 3 wherein said blend is formed into an article by molding or extrusion.

11. A clear thermoplastic blend according to claim 3, wherein the second blend component is derived from cyclohexanedimethanol or equivalents and dimethylcyclohexanecarboxylic acid or equivalents.

12. A clear thermoplastic blend according to claim 11, wherein said third resin component consists essentially of the product of a condensation reaction of a mixture 1,4-cyclohexanedimethanol or equivalents and a terephthalic acid or equivalent, and isophthalic acid or equivalents wherein said isophthalic acid or equivalent is present in said mixture in an amount effective for enhancing the clarity of the three component blend.

13. A clear thermoplastic blend according to claim 11, wherein said third component consists essentially of the condensation reaction of a mixture of 1,4-cyclohexanedimethanol or equivalents and ethylene glycol with terephthalic acid or equivalents wherein said ethylene glycol is present in said mixture in an amount effective for enhancing the clarity of the three component blend.

* * * * *

UNITED STATES PATENT AND TRADEMARK OFFICE
CERTIFICATE OF CORRECTION

PATENT NO. : 6,949,599 B2
DATED : September 27, 2005
INVENTOR(S) : Vollenberg et al.

It is certified that error appears in the above-identified patent and that said Letters Patent is hereby corrected as shown below:

Column 22,
Line 2, "ingredients" should read -- ingredient --.

Signed and Sealed this

Third Day of January, 2006

JON W. DUDAS
*Director of the United States Patent and Trademark Office*